United States Patent
Rajkotia

(10) Patent No.: US 7,421,280 B2
(45) Date of Patent: Sep. 2, 2008

(54) WIRELESS NETWORK AND WIRELESS ACCESS TERMINALS USING ENHANCED SYNC_ID PARAMETER

(75) Inventor: Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 799 days.

(21) Appl. No.: 10/872,804

(22) Filed: Jun. 21, 2004

(65) Prior Publication Data

US 2005/0107104 A1      May 19, 2005

Related U.S. Application Data

(60) Provisional application No. 60/519,944, filed on Nov. 14, 2003.

(51) Int. Cl.
*H04Q 7/32* (2006.01)
*H04Q 7/20* (2006.01)

(52) U.S. Cl. ............... 455/502; 455/501; 455/500; 455/412.1; 455/412.2; 455/434; 370/345; 370/350; 370/503; 370/509; 370/510

(58) Field of Classification Search .......... 455/502, 455/501, 500, 517, 422.1, 403, 412.1, 412.3, 455/418, 419, 420, 434, 432.1, 550.1, 466, 455/412.2, 426.1, 426.2; 370/345, 350, 503, 370/509, 510, 512
See application file for complete search history.

(56) References Cited

U.S. PATENT DOCUMENTS

| 2003/0143989 | A1* | 7/2003 | Ho et al. ................ 455/418 |
| 2004/0157631 | A1* | 8/2004 | Stobart ................... 455/502 |

* cited by examiner

*Primary Examiner*—Keith T Ferguson

(57) ABSTRACT

A mobile station capable of determining a SYNC_ID parameter for a base station serving said mobile station comprises: (i) a memory capable of storing prefix information and an associated SYNC_ID parameter; (ii) a transceiver capable of receiving identity information from the base station and transmitting the SYNC_ID parameter to the base station; and (iii) a controller capable of comparing the prefix information with the identity information, and in response to a match between the prefix information and the identity information, retrieving the SYNC_ID parameter associated with the prefix information.

40 Claims, 7 Drawing Sheets

WIRELESS NETWORK AND WIRELESS ACCESS TERMINALS USING ENHANCED SYNC_ID PARAMETER

CROSS-REFERENCE TO RELATED APPLICATION AND CLAIM OF PRIORITY

The present invention is related to that disclosed in U.S. Provisional Patent Application Ser. No. 60/519,944, filed Nov. 14, 2003, entitled "Wireless Network and Wireless Access Terminals Using Enhanced Sync_ID Parameter". U.S. Provisional Patent Application Ser. No. 60/519,944 is assigned to the assignee of the present application. The subject matter disclosed in U.S. Provisional Patent Application Ser. No. 60/519,944 is hereby incorporated by reference into the present disclosure as if fully set forth herein. The present invention hereby claims priority under 35 U.S.C. §119(e) to U.S. Provisional Patent Application Ser. No. 60/519,944.

TECHNICAL FIELD OF THE INVENTION

The present invention is directed, in general, to wireless networks and, more specifically, to CDMA2000 wireless network base stations and wireless mobile stations that use an enhanced SYNC_ID parameter.

BACKGROUND OF THE INVENTION

To reduce the negotiation time between a wireless access terminal (e.g., a cell phone or other mobile station) and a base station during a call set-up procedure, code division multiple access (CDMA) wireless networks have begun implementing a parameter called the SYNC_ID. The SYNC_ID is a variable length, signature code of the service configuration record (SCR) and the non-negotiable service configuration record (NNSCR) parameters. Without the SYNC_ID parameter, a call set-up procedure could require anywhere from an extra few hundred milliseconds up to several extra seconds.

However, the generation of signature codes is not standardized among base station vendors. Under the latest release of cdma2000 standards, the mobile station is capable of storing at least four SYNC_ID values (or signature codes). Thus, as a mobile station travels through the coverage areas of four base transceiver subsystems, the mobile station stores four different SYNC_ID parameters.

If the mobile station later visits one of the four previously visited base transceiver subsystems, the mobile station may not know which of the four SYNC_ID values to use. Even though the mobile station has stored the SYNC_ID parameter values of all the visited base transceiver subsystems, the mobile station may not able to pick the correct SYNC_ID. Typically, in this situation, the mobile station attempts to guess the correct SYNC_ID parameter, and originates with the selected SYNC_ID parameter. The base station rejects or accepts the SYNC_ID sent by the mobile station, depending on whether that SYNC_ID value is available to the base station.

Under conventional approaches, there is no mechanism in place to allow the mobile station or base station to choose another proposed SYNC_ID. Hence if the mobile station guess is wrong the first time, and the base station rejects the SYNC_ID value, the base station also rejects the call. Thus, the usefulness of the SYNC_ID value feature relies on the mobile station correctly guessing the correct SYNC_ID value. The various failure scenarios involving the SYNC_ID result in longer call set-up time, because if the base station rejects the proposed SYNC_ID, the mobile station must start the process of origination all over again. In sum, the current approach to using the SYNC_ID parameter is problematic.

Therefore, there is a need in the art for improved wireless networks and improved wireless terminals for accessing the wireless networks. In particular, there is a need for CDMA2000 wireless network base stations and wireless mobile stations that use an enhanced SYNC_ID parameter to minimize the number of dropped calls.

SUMMARY OF THE INVENTION

The present invention adds a system identifier (SID) field, a network identifier (NID) field, and a base station identifier (BASE_ID) as prefix information of each SYNC_ID parameter generated by a base station. Thus, when a mobile station receives a SYNC_ID parameter, the mobile station stores the prefix information, along with the SYNC_ID parameter. The prefix information and associated SYNC_IDs for each base station in a system can be broadcast on an overhead channel and stored by each mobile station within the system. When a mobile station originates a call to a serving base station within the system, the mobile station compares the SID, NID and BASE_ID parameters of the serving base station with the SID, NID and BASE_ID parameters the mobile station previously received as overhead information. If a match occurs, the mobile station selects the SYNC_ID parameter associated with the SID, NID and BASE_ID of the serving base station.

To address the above-discussed deficiencies of the prior art, it is a primary object of the present invention to provide, for use in a wireless network, a mobile station capable of determining a SYNC_ID parameter for a base station serving said mobile station. According to an advantageous embodiment of the present invention, the mobile station comprises: (i) a memory capable of storing prefix information and an associated SYNC_ID parameter; (ii) a transceiver capable of receiving identity information from the base station and transmitting the SYNC_ID parameter to the base station; and (iii) a controller capable of comparing the prefix information with the identity information, and in response to a match between the prefix information and the identity information, retrieving the SYNC_ID parameter associated with the prefix information.

According to one embodiment of the present invention, the prefix information includes a base station identity, a network identity and a system identity.

According to another embodiment of the present invention, the mobile station is capable of storing a list of prefix information and associated SYNC_ID parameters and comparing the identity information to each of the prefix information in the list to determine the SYNC_ID parameter associated with the identity information.

According to still another embodiment of the present invention, the mobile station is capable of receiving on an overhead channel the list of prefix information and associated SYNC_ID parameters.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller"

means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
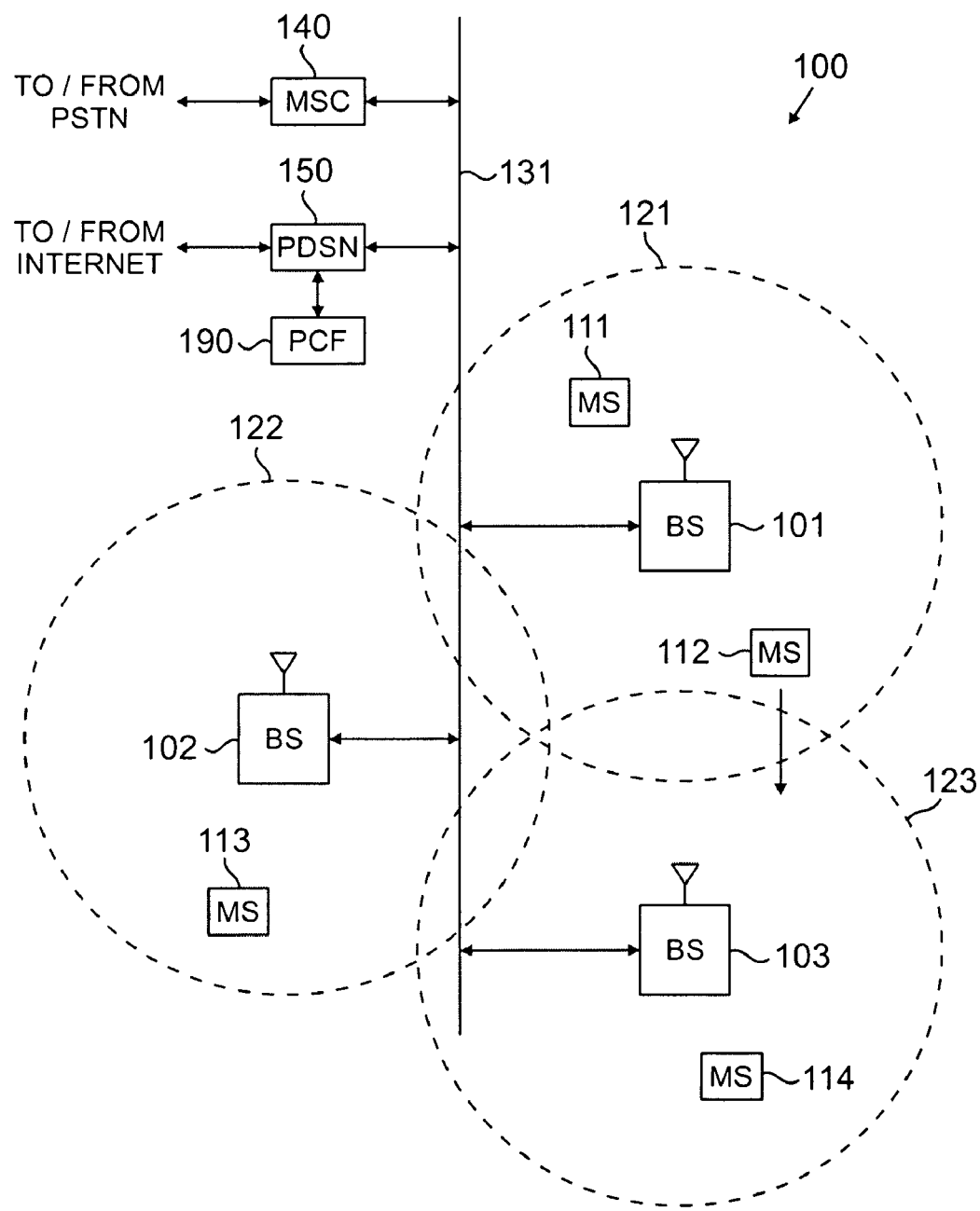
FIG. 1 illustrates an exemplary wireless network, which uses an enhanced SYNC_ID parameter according to the principles of the present invention.

FIG. 1 illustrates exemplary wireless network 100, which uses an enhanced SYNC_ID parameter according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to the IS-2000-C standard (i.e., Release C of cdma2000). Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102 or BS 103 to MSC 140.

In the embodiment of wireless network 100 shown in FIG. 1, MS 111 and MS 112 are located in cell site 121 and communicate with BS 101. MS 113 is located in cell site 122 and communicates with BS 102 and MS 114 is located in cell site 123 and communicates with BS 103. MS 112 is located close to the edge of cell site 123 and moves in the direction of cell site 123, as indicated by the direction arrow proximate MS 112. At some point, as MS 112 moves into cell site 123 and out of cell site 121, a handoff will occur.

As is well known to those skilled in the art, the handoff procedure transfers control of a call from a first cell to a second cell. A handoff may be either a "soft" handoff or a "hard" handoff. In a soft handoff, a connection is made between the mobile station and the base station in the second cell before the existing connection is broken between the mobile station and the base station in the first cell. In a hard handoff, the existing connection between the mobile station and the base station in the first cell is broken before a new connection is made between the mobile station and the base station in the second cell.

As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft handoff process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft handoff assumes the mobile station is in a voice or data call. An idle handoff is the hand-off between cell sites of a mobile station that is communicating in the control or paging channel.

Figure 2:
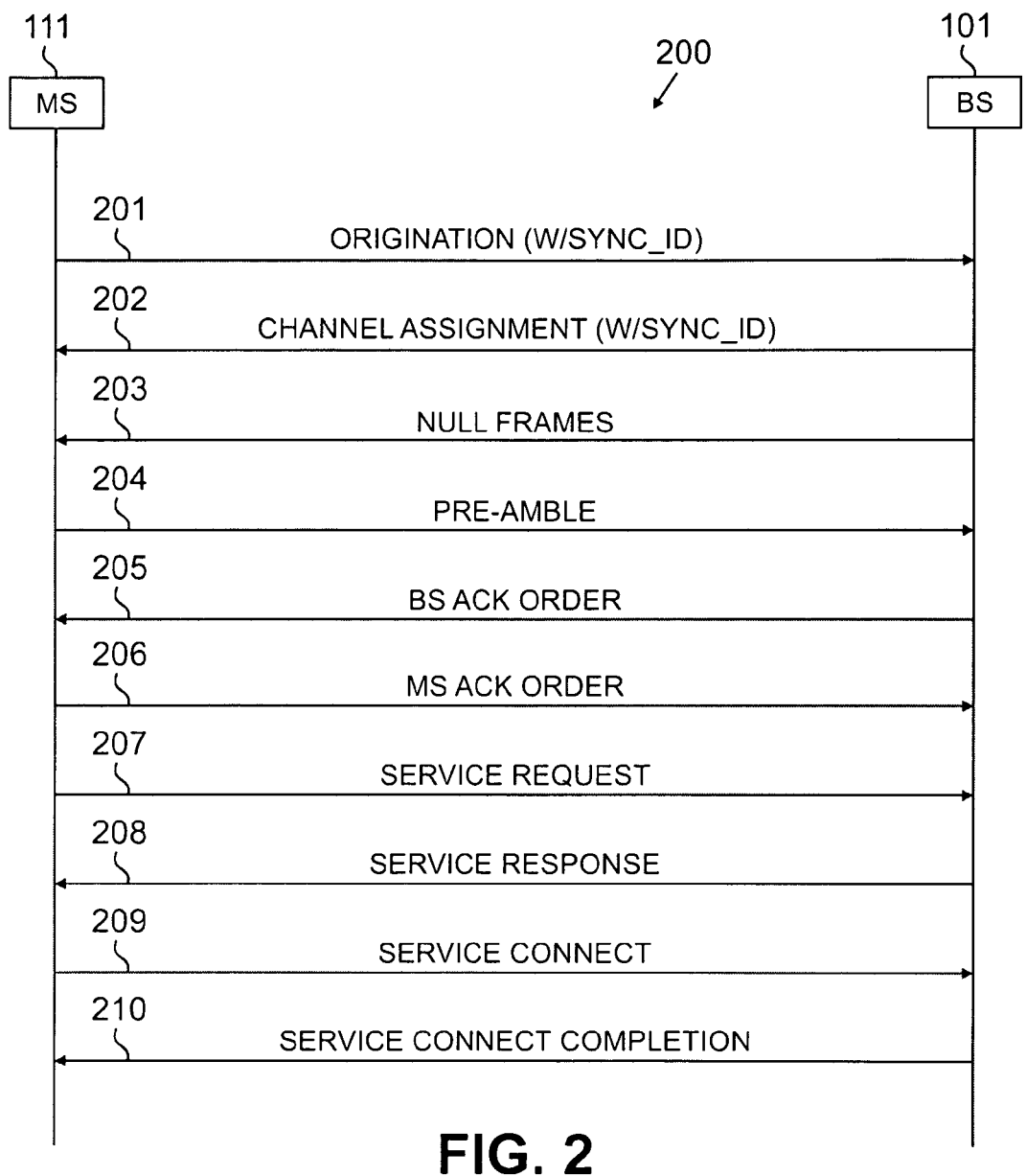
FIG. 2 illustrates a modified SYNC_ID parameter according to the principles of the present invention.

To improve system performance and minimize dropped calls, wireless network 100 and the mobile stations accessing wireless network 100 implement an enhanced SYNC_ID parameter according to the principles of the present invention. FIG. 2 illustrates an enhanced SYNC_ID parameter 200 according to one embodiment of the present invention. Enhanced SYNC_ID parameter 200 comprises prefix information including a system identifier (SID) field 210, network identifier (NID) field 220, and base station identifier (BASE_ID) field 230, which are appended to a conventional SYNC_ID parameter 240. The SID field 210 identifies the system of the base station (e.g., BS 101), the NID field 220 identifies the wireless network (e.g., wireless network 100) of BS 101 and the BASE_ID 230 identifies BS 101 itself. The conventional SYNC_ID parameter 240 includes a SYNC_ID, which is a variable length, signature code of the SCR and NNSCR parameters for BS 101.

The values of the prefix information (i.e., SID, NID and BASE_ID) for one or more base stations are stored in the mobile station, along with the associated SYNC_IDs for the respective base stations. For example, each base station may generate more than one SYNC_ID. As a result, in the internal memory of the mobile station, all of the SYNC_IDs generated by a particular base station are associated with the prefix information (i.e., SID, NID and BASE_ID) for that particular base station.

In one embodiment, the prefix information and associated SYNC_IDs are downloaded into the internal memory of the mobile station upon activation of the mobile station. In another embodiment, the prefix information and SYNC_IDs for one or more base stations in a particular network service area are downloaded into the internal memory of the mobile station from a base station upon entering the particular network service area. For example, a network service area can be divided into zones, and the prefix information and SYNC_IDs for a currently serving zone can be downloaded to the mobile station. As another example, the prefix information and SYNC_ID for a particular base station can be sent to the mobile station in an In-Traffic System Parameters message (ITSPM). The prefix information can also be included in a handoff message from a new base station when the mobile station is involved in a handoff to the new base station.

In operation, the mobile station correctly identifies an appropriate SYNC_ID parameter 240 for a currently serving base station by comparing the prefix information (i.e., the SID 210, NID 220 and BASE_ID 230) of the stored enhanced SYNC_ID parameters 200 with identity information (i.e., SID, NID and BASE_ID) received from the currently serving base station in the overhead channel messages. If there is more than one SYNC_ID listed for the base station, the mobile station selects one of the SYNC_IDs that maps to a signature code that the mobile station supports. The mobile station sends the selected SYNC_ID to the base station. Therefore, the mobile station is not required to guess the SYNC_ID parameter for the base station.

Figure 3:
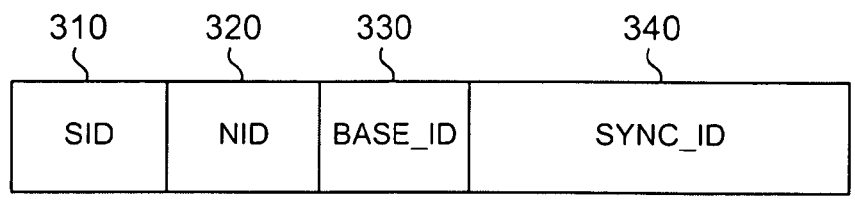
FIG. 3 is a message flow diagram illustrating the operation of a wireless network and a wireless access terminal (i.e., mobile station) according to one embodiment of the present invention.

In another embodiment, instead of the mobile station storing prefix information and associated SYNC_IDs for one or more base stations, the negotiation process between the base station and the mobile station can be extended in order to minimize dropped calls. FIG. 3 depicts message flow diagram 300, which illustrates the operation of base station 101 and mobile station 111 according to the principles of the present invention. MS 111 and BS 101 exchange wireless messages 301-310 over the air interface. Wireless messages 301-310 include: Origination message 301, Channel Assignment message 302 (e.g., ECAM), Null Frames 303, Preamble 304, BS Acknowledgment (ACK) Order message 305, MS Acknowledgment (ACK) Order message 306, Service Request message 307, Service Response message 308, Service Connect message 309, and Service Connect Completion message 310.

When the mobile station (e.g., MS 111) proposes a SYNC_ID in Origination message 301 that the base station (e.g., BS 101) does not have the signature code for, BS 101 does not send a reject message. Instead, BS 101 proposes a different SYNC_ID that is acceptable to BS 101 in, for example, Channel Assignment message 302. If MS 111 does not have the signature code of the SYNC_ID proposed by BS 101, MS 111 sends Service Request message 307 and proposes an additional different SYNC_ID to BS 101. If the additional different SYNC_ID is still not acceptable to BS 101, the BS 101 can propose a further different SYNC_ID to the MS 111 in Service Response message 308. If there is still no agreement on an acceptable SYNC_ID, BS 101 then sends the reject message and the call set-up negotiation procedure begins again, as is understood in the art.

Figure 4:
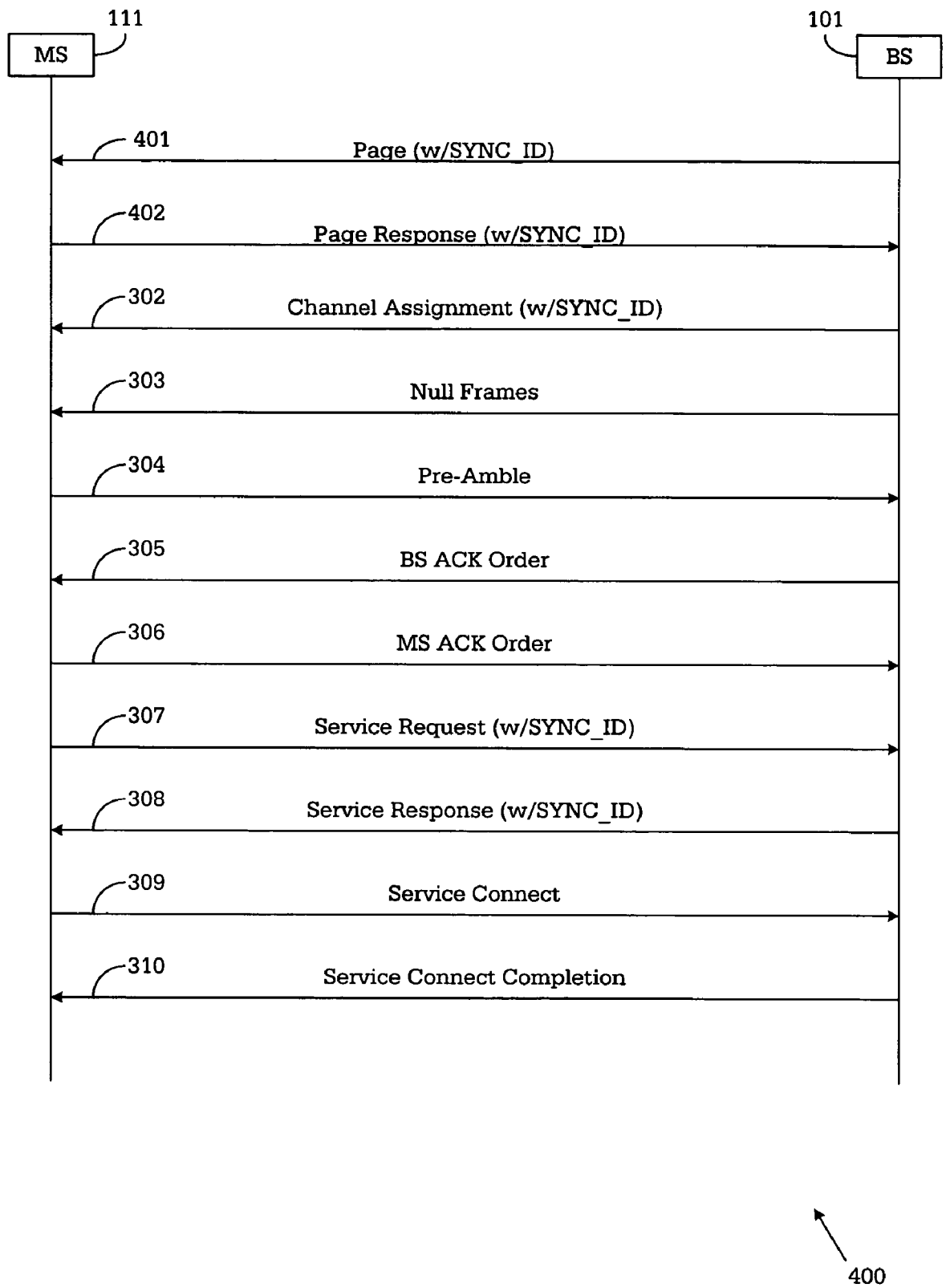
FIG. 4 is a message flow diagram illustrating the operation of a wireless network and a wireless access terminal (i.e., mobile station) according to another embodiment of the present invention.

In the case of a mobile station terminated call, as shown in the message flow diagram 400 of FIG. 4, Origination message 301 is replaced by a Page message 401 and a Page Response message 402. When BS 101 proposes a first SYNC_ID in Page message 401 that MS 111 does not have the signature code for, MS 111 responds back with Page Response message 402, in which MS 111 includes a second proposed SYNC_ID. If BS 101 does not have the signature code for the second SYNC_ID, BS 101 has the opportunity to propose still a third SYNC_ID in, for example, Channel Assignment message 302. Then, the same procedure as for an Origination message described above in connection with FIG. 3 occurs.

Figure 5:
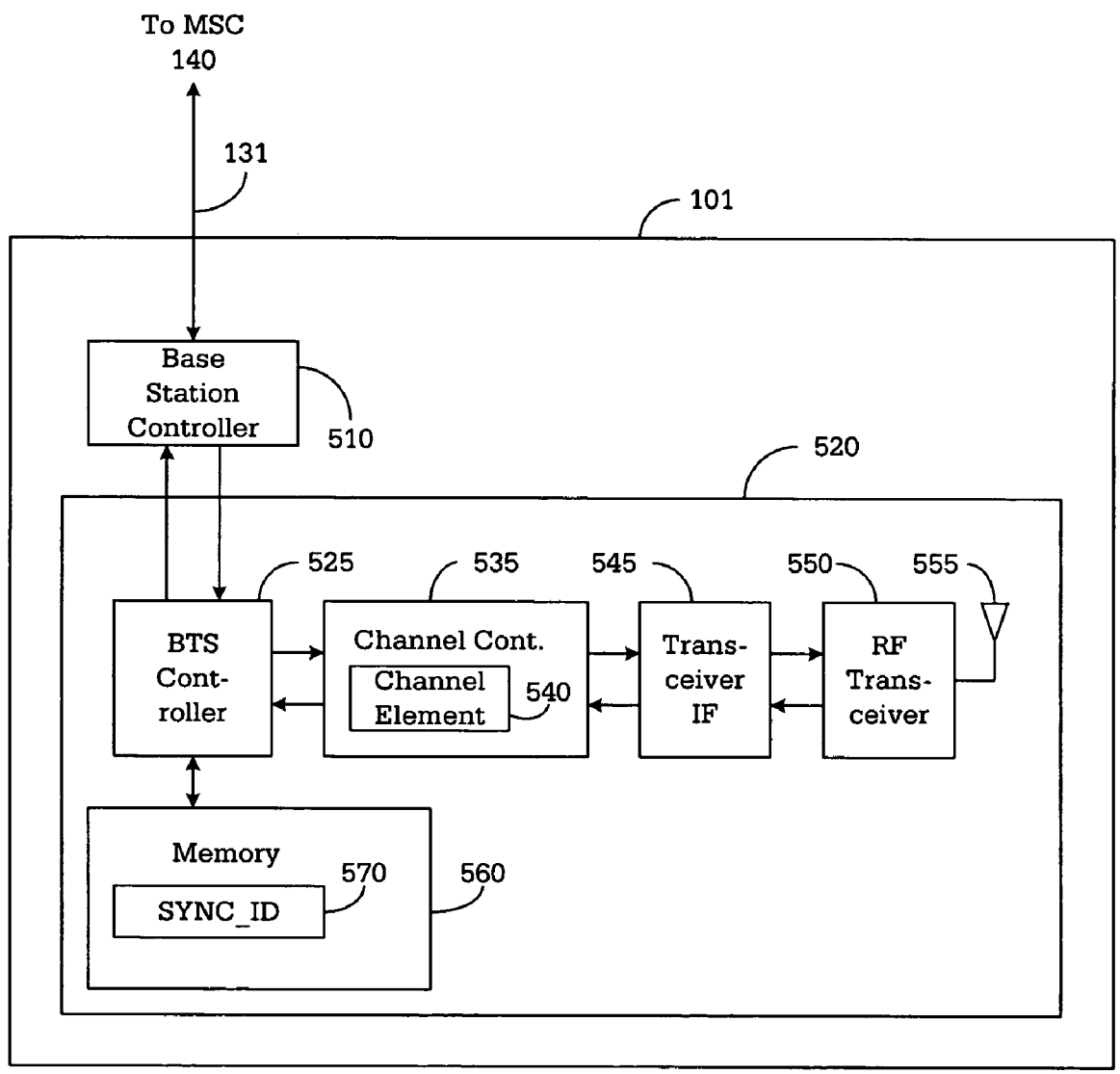
FIG. 5 illustrates an exemplary base station according to embodiments of the present invention.

FIG. 5 illustrates exemplary base station 101 in greater detail according to embodiments of the present invention. Base station 101 comprises base station controller (BSC) 510 and base transceiver subsystem (BTS) 520. Base station controllers and base transceiver subsystems were described previously in connection with FIG. 1. BSC 510 manages the resources in cell site 121, including BTS 520. BTS 520 comprises BTS controller 525, channel controller 535, transceiver interface (IF) 545, RF transceiver unit 550, and antenna array 555. Channel controller 535 comprises a plurality of channel elements, including exemplary channel element 540. BTS 520 also comprises memory 560 storing one or more SYNC_IDs 570.

BTS controller 525 comprises processing circuitry and memory capable of executing an operating program that communicates with BSC 510 and controls the overall operation of BTS 520. Under normal conditions, BTS controller 525 directs the operation of channel controller 535, which contains a number of channel elements, including channel element 540, that perform bi-directional communications in the forward channels and the reverse channels. A forward channel refers to a channel in which signals are transmitted from the base station to the mobile station. A reverse channel refers to a channel in which signals are transmitted from the mobile station to the base station. In an advantageous embodiment of the present invention, the channel elements communicate according to a code division multiple access (CDMA) protocol with the mobile stations in cell 121. Transceiver IF 545 transfers the bi-directional channel signals between channel controller 540 and RF transceiver unit 550.

Antenna array 555 transmits forward channel signals received from RF transceiver unit 550 to mobile stations in the coverage area of BS 101. Antenna array 555 also sends to transceiver 550 reverse channel signals received from mobile stations in the coverage area of BS 101. In a preferred embodiment of the present invention, antenna array 555 is a multi-sector antenna, such as a three-sector antenna in which each antenna sector is responsible for transmitting and receiving in a 120° arc of coverage area. Additionally, RF transceiver 550 may contain an antenna selection unit to select among different antennas in antenna array 555 during transmit and receive operations.

According to an exemplary embodiment of the present invention, BTS controller 525 and memory 560 are capable of negotiating call set-up procedures with mobile stations 111-114. BTS controller 525 accesses memory 560 to retrieve a SYNC_ID 570 that maps to a signature code that BS 101 supports. The retrieved SYNC_ID 570 can be a default SYNC_ID 570 preferred by BS 101 or an alternate SYNC_ID 570 that is acceptable to BS 101.

According to one embodiment of the present invention, BTS controller 525 coordinates with BSC 510 to add one or more enhanced SYNC_ID parameters (e.g., enhanced SYNC_ID parameter 200) associated with one or more base stations (e.g., BS 101, BS 102 and BS 103) to an overhead message (e.g., system parameters message, extended system parameters message) or a traffic channel message (e.g., ITSPM, UHDM, GHDM) to indicate the SYNC_IDs supported by one or more base stations within a wireless network 100. Each enhanced SYNC_ID parameter 200 comprises prefix information identifying a particular base station appended to a conventional SYNC_ID parameter that identifies a SYNC_ID supported by the particular base station.

According to another embodiment of the present invention, BTS controller 525 accesses memory 560 to retrieve a SYNC_ID 570 that is either proposed by BS 101 or proposed by a mobile station during negotiation of a call set-up procedure. The retrieved SYNC_ID 570 may be either the default SYNC_ID 570 or an alternate SYNC_ID 570.

To retrieve a SYNC_ID 570 proposed by the mobile station, BTS controller 525 compares the SYNC_ID proposed by the mobile station and received via transceiver 550 with the SYNC_IDs 570 stored in memory 560 to determine if a match occurs. If a match does occur, BTS controller 525 retrieves the matching SYNC_ID 570 from memory 570 and uses the associated signature code to establish a call connection with the mobile station. If a match does not occur, BTS controller 525 accesses memory 560 to retrieve an acceptable SYNC_ID 570 that is supported by BS 101. The acceptable SYNC_ID 570 may be the default SYNC_ID or an alternate SYNC_ID.

To propose a retrieved SYNC_ID 570 to a target mobile station, BTS controller 525 includes the proposed SYNC_ID 570 in an individual message (e.g., Page or Channel Assignment) sent via transceiver 550 to the target mobile station. The retrieved SYNC_ID 570 may be the default SYNC_ID or an alternate SYNC_ID in response to a determination that the target mobile station does not support the default SYNC_ID.

Figure 6:
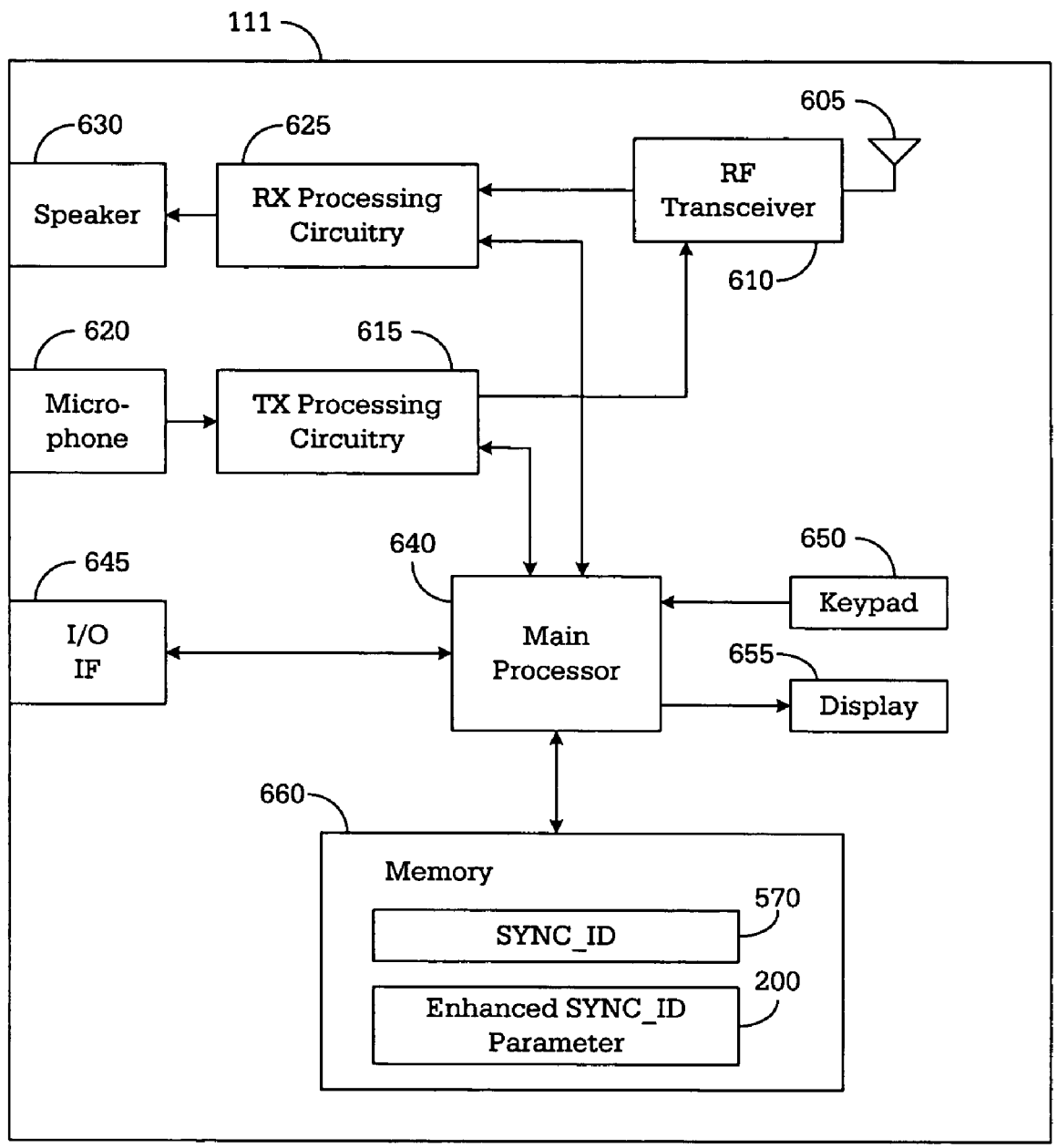
FIG. 6 illustrates an exemplary wireless mobile station according to embodiments of the present invention.

FIG. 6 illustrates exemplary wireless mobile station 111 according to an advantageous embodiment of the present invention. Wireless mobile station 111 comprises antenna 605, radio frequency (RF) transceiver 610, transmit (TX) processing circuitry 615, microphone 620, and receive (RX) processing circuitry 625. MS 111 also comprises speaker 630, main processor 640, input/output (I/O) interface (IF) 645, keypad 650, display 655, and memory 660. Memory 660 further comprises SYNC_IDs 570 that are supported by mobile station 111 and, in one embodiment, one or more enhanced SYNC_ID parameters 200 received by mobile station 111.

Radio frequency (RF) transceiver 610 receives from antenna 605 an incoming RF signal transmitted by a base station of wireless network 100. Radio frequency (RF) transceiver 610 down-converts the incoming RF signal to produce an intermediate frequency (IF) or a baseband signal. The IF or baseband signal is sent to receiver (RX) processing circuitry 625 that produces a processed baseband signal by filtering, decoding, and/or digitizing the baseband or IF signal. Receiver (RX) processing circuitry 625 transmits the processed baseband signal to speaker 630 (i.e., voice data) or to main processor 640 for further processing (e.g., web browsing).

Transmitter (TX) processing circuitry 615 receives analog or digital voice data from microphone 620 or other outgoing baseband data (e.g., web data, e-mail, interactive video game data) from main processor 640. Transmitter (TX) processing circuitry 615 encodes, multiplexes, and/or digitizes the outgoing baseband data to produce a processed baseband or IF signal. Radio frequency (RF) transceiver 610 receives the outgoing processed baseband or IF signal from transmitter (TX) processing circuitry 615. Radio frequency (RF) transceiver 610 up-converts the baseband or IF signal to a radio frequency (RF) signal that is transmitted via antenna 605.

In an advantageous embodiment of the present invention, main processor 640 is a microprocessor or microcontroller. Memory 660 is coupled to main processor 640. Memory 660 may comprise a random access memory (RAM), a Flash memory, which acts as a read-only memory (ROM), or any other type of storage device.

Main processor 640 controls the overall operation of wireless mobile station 111. In one such operation, main processor 640 controls the reception of forward channel signals and the transmission of reverse channel signals by radio frequency (RF) transceiver 610, receiver (RX) processing circuitry 625, and transmitter (TX) processing circuitry 615, in accordance with well-known principles.

Main processor 640 is coupled to I/O interface 645. I/O interface 645 provides mobile station 111 with the ability to connect to other devices such as laptop computers and handheld computers. I/O interface 645 is the communication path between these accessories and main controller 640. Main processor 640 is also coupled to keypad 650 and display unit 655. The operator of mobile station 111 uses keypad 650 to enter data into mobile station 111. Display 655 may be a liquid crystal display capable of rendering text and/or at least limited graphics from web sites. Alternate embodiments may use other types of displays.

According to the principles of the present invention, memory 660 stores one or more SYNC_IDs 570 that map to signature codes that mobile station 111 supports. Main processor 640 and memory 660 operate to negotiate a call set-up procedure with a currently serving base station. Main processor 640 accesses memory 660 to retrieve a SYNC_ID 570 to be used for a call connection.

According to one embodiment of the present invention, one or more enhanced SYNC_ID parameters 200 associated with one or more base stations (e.g., BS 101, BS 102 and BS 103) are also stored in memory 660. Each enhanced SYNC_ID parameter 200 comprises prefix information identifying a particular base station appended to a conventional SYNC_ID parameter that identifies a SYNC_ID supported by the particular base station. Main processor 640 receives and stores the enhanced SYNC_ID parameters 200 in memory 660. The enhanced SYNC_ID parameters may be downloaded to mobile station 111 upon activation or received via transceiver 610 upon entering a new network service area.

When mobile station 111 enters a cell site (e.g., cell site 121) served by a base station (e.g., BS 101), mobile station 111 receives via transceiver 610 identity information identifying BS 101 on an overhead channel (e.g., system parameters message, extended system parameters message). The identity information is sent to main processor 640 to compare the identity information with the prefix information for each enhanced SYNC_ID parameter 200 stored in memory 660.

When a match occurs between the received identity information and the prefix information of a particular enhanced SYNC_ID parameter 200, main processor 640 compares the SYNC_ID of the particular enhanced SYNC_ID parameter 200 with the SYNC_IDs 570 supported by the mobile station 111. If the SYNC_ID of the particular enhanced SYNC_ID parameter 200 is supported by the mobile station 111, main processor 640 retrieves the SYNC_ID 570 associated with the enhanced SYNC_ID parameter 200 stored in memory 660 and causes transceiver 610 to transmit the retrieved SYNC_ID in, for example, an origination message, to BS 101.

According to another embodiment of the present invention, main processor 640 accesses memory 660 to retrieve a SYNC_ID 570 that is either proposed by BS 101 or proposed by the mobile station 111 during negotiation of a call set-up procedure. To retrieve a SYNC_ID 570 proposed by BS 101, main processor 640 compares the SYNC_ID proposed by BS 101 and received via transceiver 610 in, for example, a Page message or a Channel Assignment message, with the SYNC_IDs 570 stored in memory 660 to determine if a match occurs. If a match does occur, main processor 640 retrieves the matching SYNC_ID 570 from memory 660 and uses the associated signature code to establish a call connection with BS 101. If a match does not occur, main processor 640 may access memory 660 to retrieve an acceptable SYNC_ID 570 that is supported by mobile station 111.

To propose a SYNC_ID to BS 101, main processor 640 accesses memory 660 to retrieve a SYNC_ID 570 supported by mobile station 111. Then, main processor 640 causes transceiver 610 to send the retrieved SYNC_ID 570 to BS 101 in, for example, an Origination message or a Page Response message.

Figure 7:
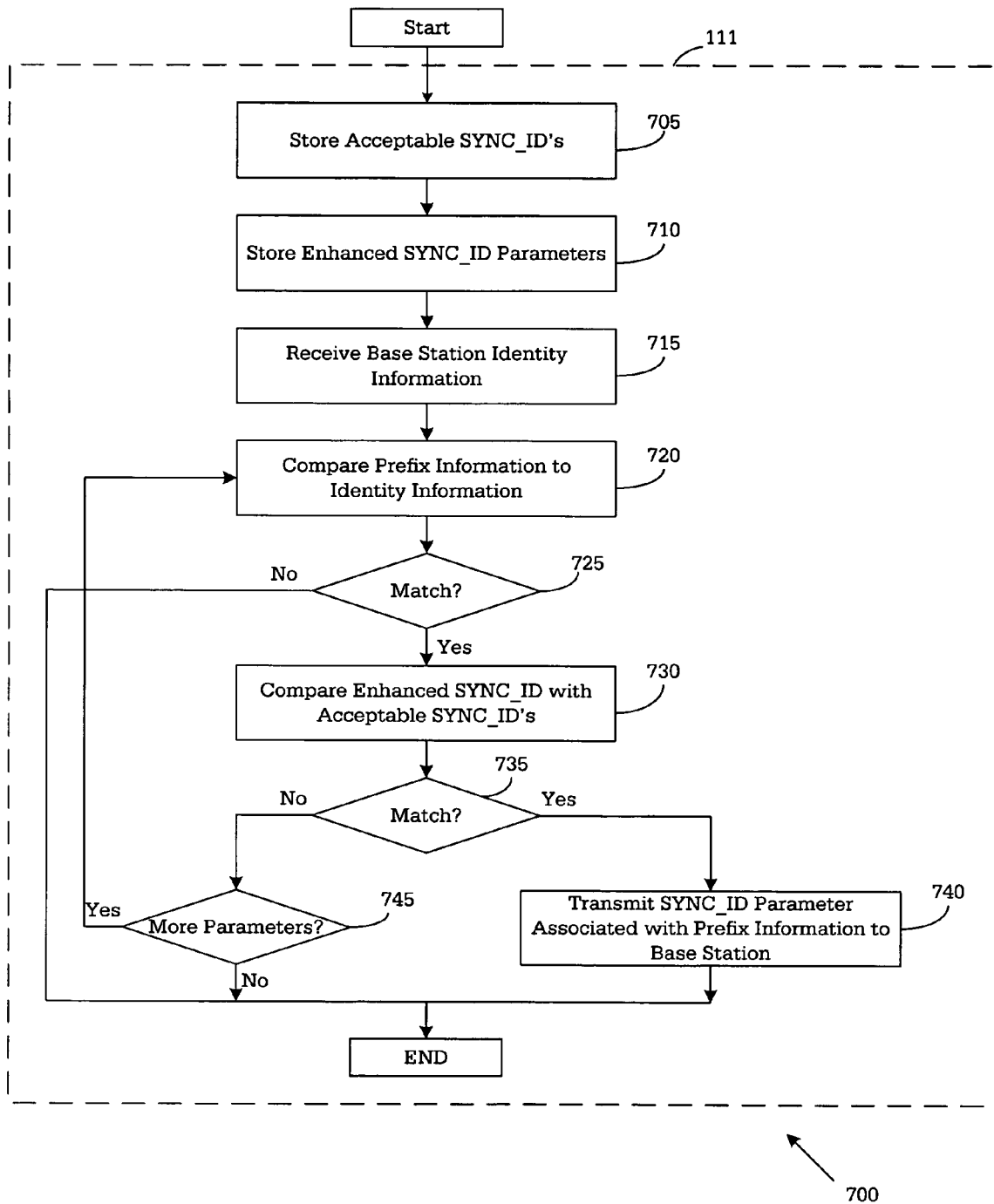
FIG. 7 is a flow diagram illustrating an exemplary process for a mobile station to determine a SYNC_ID acceptable to a base station according to one embodiment of the present invention.

FIG. 7 depicts flow diagram 700, which illustrates an exemplary process for mobile station 111 to determine a SYNC_ID acceptable to a base station (e.g., BS 101) according to one embodiment of the present invention. Initially, mobile station 111 stores one or more acceptable SYNC_IDs 570 supported by mobile station and one or more enhanced SYNC_ID parameters 200 associated with one or more base stations (process steps 705 and 710).

Upon entering cell site 121 served by BS 101, mobile station receives identity information identifying BS 101 on an overhead channel (process step 715). Mobile station 111 then compares the received identity information with the stored prefix information for each enhanced SYNC_ID parameter 200 (process step 720). If a match occurs between the received identity information and the prefix information of a particular enhanced SYNC_ID parameter 200 (Y branch of decision step 725), mobile station 111 compares the SYNC_ID of the particular enhanced SYNC_ID parameter 200 with the SYNC_IDs 570 supported by the mobile station 111 (process step 730). If a match does not occur between the received identity information and the prefix information of any SYNC_ID parameter 200 stored in mobile station 111 (N branch of decision step 725), the process ends and a call set-up negotiation procedure according to FIG. 8 or a conventional call set-up negotiation procedure begins.

If the SYNC_ID of the particular enhanced SYNC_ID parameter 200 is supported by the mobile station 111 (Y branch of decision step 725), the mobile station transmits the SYNC_ID 570 associated with the enhanced SYNC_ID parameter 200 to the BS 101 in, for example, an origination message (process step 740). If the SYNC_ID of the particular enhanced SYNC_ID parameter 200 is not supported by the mobile station (N branch of decision step 725), and there are other enhanced SYNC_ID parameters 200 stored in the mobile station (Y branch of decision step 750), the mobile station 111 compares the identity information to the prefix information for another enhanced SYNC_ID parameter (process step 720). If the SYNC_ID of the particular enhanced SYNC_ID parameter 200 is not supported by the mobile station (N branch of decision step 725), and there are no other enhanced SYNC_ID parameters 200 stored in the mobile station (N branch of decision step 750), the process ends and a call connection is not established between the mobile station 111 and BS 101.

Figure 8:
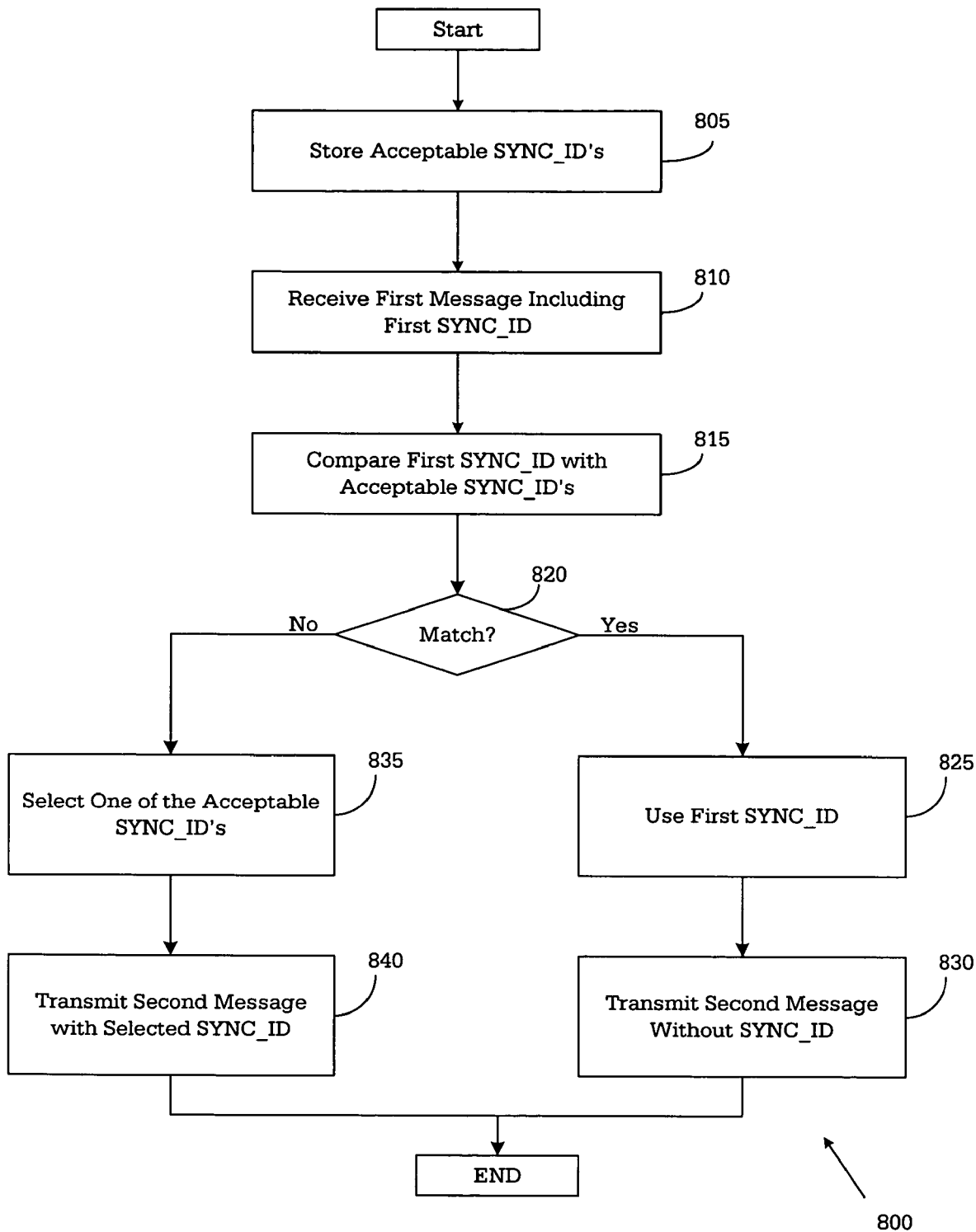
FIG. 8 is a flow diagram illustrating an exemplary process for negotiating a call set-up procedure according to one embodiment of the present invention.

FIG. 8 depicts a flow diagram 800, which illustrates an exemplary process for negotiating a call set-up procedure according to one embodiment of the present invention. Initially, a first telecommunications node (e.g., mobile station 111 or BS 101) stores one or more acceptable SYNC_IDs 570 supported by the first telecommunications node (process step 805).

When the first telecommunications node receives a first message (e.g., origination message or Page message) comprising a first proposed SYNC_ID from a second telecommunications node (process step 810), the first telecommunications node compares the SYNC_ID proposed by the second telecommunications node with the acceptable SYNC_IDs 570 stored in the first telecommunications node to determine if a match occurs (process step 815). If a match does occur (Y branch of decision step 820), the first telecommunications node uses the first SYNC_ID 570 for a call connection with the second telecommunications node (process step 825) and transmits a second message (e.g., Page Response message, Channel Assignment message or Service Request message) to the second telecommunications node to establish the call connection (process step 830).

If a match does not occur (N branch of process step 820), the first telecommunications node selects one of the acceptable SYNC_IDs 570 that is supported by the first telecommunications node (process step 835). The selected SYNC_ID 570 is transmitted from the first telecommunications node to the second telecommunications node in a second message (e.g., Page Response message, Channel Assignment message or Service Request message) (process step 840).

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a mobile station capable of determining a SYNC_ID parameter for a base station serving said mobile station, said mobile station comprising:
   a memory capable of storing prefix information and an associated SYNC_ID parameter;
   a transceiver capable of receiving identity information from said base station and transmitting said SYNC_ID parameter to said base station; and
   a controller capable of comparing said prefix information with said identity information, and in response to a match between said prefix information and said identity information, retrieving said SYNC_ID parameter associated with said prefix information.

2. The mobile station as set forth in claim 1 wherein said prefix information includes a base station identity.

3. The mobile station as set forth in claim 2 wherein said prefix information further includes a network identity.

4. The mobile station as set forth in claim 3 wherein said prefix information further includes a system identity.

5. The mobile station as set forth in claim 1 wherein said memory is further capable of storing a list of prefix information and associated SYNC_ID parameters.

6. The mobile station as set forth in claim 5 wherein said controller is further capable of comparing said identity information to each said prefix information in said list to determine said SYNC_ID parameter associated with said identity information.

7. The mobile station as set forth in claim 5 wherein said transceiver is further capable of receiving on an overhead channel said list of prefix information and associated SYNC_ID parameters.

8. A wireless network comprising a plurality of mobile stations, each one of said mobile stations capable of determining a SYNC_ID parameter for a base station serving said mobile station, said each mobile station comprising:
   a memory capable of storing prefix information and an associated SYNC_ID parameter;
   a transceiver capable of receiving identity information from said base station and transmitting said SYNC_ID parameter to said base station; and
   a controller capable of comparing said prefix information with said identity information, and in response to a match between said prefix information and said identity information, retrieving said SYNC_ID parameter associated with said prefix information.

9. The wireless network as set forth in claim 8 wherein said prefix information includes a base station identity.

10. The wireless network as set forth in claim 9 wherein said prefix information further includes a network identity.

11. The wireless network as set forth in claim 10 wherein said prefix information further includes a system identity.

12. The wireless network as set forth in claim 8 wherein said memory is further capable of storing a list of prefix information and associated SYNC_ID parameters.

13. The wireless network as set forth in claim 12 wherein said controller is further capable of comparing said identity information to each said prefix information in said list to determine said SYNC_ID parameter associated with said identity information.

14. The wireless network as set forth in claim 12 wherein said transceiver is further capable of receiving on an overhead channel said list of prefix information and associated SYNC_ID parameters.

15. For use in a mobile station, a method of determining a SYNC_ID parameter for a base station serving said mobile station, the method comprising the steps of:
   storing prefix information and an associated SYNC_ID parameter;
   receiving identity information from said base station;
   comparing said prefix information with said identity information; and
   in response to a match between said prefix information and said identity information, transmitting said SYNC_ID parameter associated with said prefix information to said base station.

16. The method as set forth in claim 15 wherein said prefix information includes a base station identity.

17. The method as set forth in claim 16 wherein said prefix information further includes a network identity.

18. The method as set forth in claim 17 wherein said prefix information further includes a system identity.

19. The method as set forth in claim 15 wherein said storing further comprises storing a list of prefix information and associated SYNC_ID parameters.

20. The method as set forth in claim 19 wherein said comparing further comprises comparing said identity information to each said prefix information in said list to determine said SYNC_ID parameter associated with said identity information.

21. The method as set forth in claim 19 further comprising the step of receiving on an overhead channel said list of prefix information and associated SYNC_ID parameters.

22. For use in a wireless network, a first telecommunications node capable of negotiating a call set-up procedure with a second telecommunications node, said first telecommunications node comprising:
   a transceiver capable of receiving a first message including a first SYNC_ID parameter from said second telecommunications node and transmitting a second message including a second SYNC_ID parameter to said second telecommunications node;

a memory capable of storing at least one acceptable SYNC_ID parameter; and a controller capable of comparing said first SYNC_ID parameter with said at least one acceptable SYNC_ID parameter, and in response to a match not occurring between said first SYNC_ID parameter and said at least one acceptable SYNC_ID parameter, selecting one of the at least one acceptable SYNC_ID parameter as said second SYNC_ID parameter.

23. The first telecommunications node as set forth in claim 22 wherein said first telecommunications node is a base station and said second telecommunications node is a mobile station.

24. The first telecommunications node as set forth in claim 23 wherein said first message is a page message and said second message is a page response message.

25. The first telecommunications node as set forth in claim 22 wherein said first telecommunications node is a mobile station and said second telecommunications node is a base station.

26. The first telecommunications node as set forth in claim 25 wherein said first message is a call origination message and said second message is a channel assignment message.

27. The first telecommunications node as set forth in claim 22 wherein said transceiver is further capable of receiving a third message including a third SYNC_ID parameter from said second telecommunications node.

28. The first telecommunications node as set forth in claim 27 wherein said third message is a service request message.

29. A wireless network comprising a plurality of telecommunications nodes, each one of said telecommunications nodes capable of negotiating a call set-up procedure, said each telecommunications node comprising:

a transceiver capable of receiving a first message including a first SYNC_ID parameter and transmitting a second message including a second SYNC_ID parameter;

a memory capable of storing at least one acceptable SYNC_ID parameter; and a controller capable of comparing said first SYNC_ID parameter with said at least one acceptable SYNC_ID parameter, and in response to a match not occurring between said first SYNC_ID parameter and said at least one acceptable SYNC_ID parameter, selecting one of the at least one acceptable SYNC_ID parameter as said second SYNC_ID parameter.

30. The wireless network as set forth in claim 29 wherein said telecommunications node is a base station in wireless communication with a mobile station for said call set-up procedure.

31. The wireless network as set forth in claim 30 wherein said first message is a page message and said second message is a page response message.

32. The wireless network as set forth in claim 29 wherein said telecommunications node is a mobile station in wireless communication with a base station for said call set-up procedure.

33. The wireless network as set forth in claim 32 wherein said first message is a call origination message and said second message is a channel assignment message.

34. The wireless network as set forth in claim 29 wherein said transceiver is further capable of receiving a third message including a third SYNC_ID parameter.

35. The wireless network as set forth in claim 34 wherein said third message is a service request message.

36. For use in a wireless network, a method of negotiating a call set-up procedure between a first telecommunications node and a second telecommunications node, the method comprising the steps of:

storing at least one acceptable SYNC_ID parameter in said first telecommunications node;

receiving a first message including a first SYNC_ID parameter at said first telecommunications node from said second telecommunications node;

comparing said first SYNC_ID parameter with said at least one acceptable SYNC_ID parameter;

in response to a match not occurring between said first SYNC_ID parameter and said at least one acceptable SYNC_ID parameter, selecting one of the at least one acceptable SYNC_ID parameter as a second SYNC_ID parameter; and transmitting a second message including a second SYNC_ID parameter to said second telecommunications node.

37. The method as set forth in claim 36 wherein said first message is a page message and said second message is a page response message.

38. The method as set forth in claim 36 wherein said first message is a call origination message and said second message is a channel assignment message.

39. The method as set forth in claim 36 further comprising the step of receiving a third message including a third SYNC_ID parameter at said first telecommunications node from said second telecommunications node.

40. The method as set forth in claim 39 wherein said third message is a service request message.

* * * * *